US012552567B2

(12) United States Patent
Biondi et al.

(10) Patent No.: US 12,552,567 B2
(45) Date of Patent: Feb. 17, 2026

(54) METHOD FOR PACKAGING ARTICLES IN BOXES AND PACKAGING DEVICE OPERATING ACCORDING TO SUCH A METHOD

(71) Applicant: R.A JONES & CO., Covington, KY (US)

(72) Inventors: Andrea Biondi, Bologna (IT); Luca Cavazza, Bologna (IT); Ivanoe Bertuzzi, Bologna (IT); Enrico Campagnoli, Bologna (IT); Marco Ghini, Bologna (IT); Luca Borderi, Bologna (IT)

(73) Assignee: R.A JONES & CO., Covington, KY (US)

( * ) Notice: Subject to any disclaimer, the term of this patent is extended or adjusted under 35 U.S.C. 154(b) by 0 days.

(21) Appl. No.: 18/711,484

(22) PCT Filed: Nov. 21, 2022

(86) PCT No.: PCT/IB2022/061234
§ 371 (c)(1),
(2) Date: May 17, 2024

(87) PCT Pub. No.: WO2023/094972
PCT Pub. Date: Jun. 1, 2023

(65) Prior Publication Data

US 2025/0019104 A1 Jan. 16, 2025

(30) Foreign Application Priority Data

Nov. 24, 2021 (IT) ........................ 102021000029753

(51) Int. Cl.
*B65B 11/30* (2006.01)
*B31B 50/32* (2017.01)
(Continued)

(52) U.S. Cl.
CPC .......... *B65B 11/004* (2013.01); *B31B 50/322* (2017.08); *B65B 11/30* (2013.01); *B65B 49/02* (2013.01); *B65B 61/20* (2013.01)

(58) Field of Classification Search
CPC ... B31B 50/322; B31B 50/324; B31B 50/326; B31B 50/024; B31B 50/788;
(Continued)

(56) References Cited

U.S. PATENT DOCUMENTS 1,875,986 A * 9/1932 Bronander .............. B65B 19/24 53/575
2,059,416 A * 11/1936 Thom ..................... B31B 50/00 493/128
(Continued)

FOREIGN PATENT DOCUMENTS

DE 102020109977 A1 10/2021
EP 0064709 B1 * 8/1985 ............... B65B 5/06
EP 3546379 A1 10/2019

OTHER PUBLICATIONS

International Search Report and Written Opinion for PCT/IB2022/061234 filed on Nov. 21, 2022 on behalf of R.A Jones & Co. Mail Date: Mar. 9, 2023 10 pages.

*Primary Examiner* — Joshua G Kotis
(74) *Attorney, Agent, or Firm* — Steinfl + Bruno LLP

(57) ABSTRACT

A method for packaging articles in a box includes the steps of depositing at least one article in a mandrel, and folding a blank around the mandrel in correspondence with at least one folding line of the blank. The blank is folded along the folding line abutting the folding line and an edge of the mandrel only for a first part of the folding line, while a second part of the folding line remains not abutted by the mandrel.

16 Claims, 2 Drawing Sheets

(51) Int. Cl.
*B65B 11/00* (2006.01)
*B65B 49/02* (2006.01)
*B65B 61/20* (2006.01)

(58) Field of Classification Search
CPC ....... B65B 11/004; B65B 11/30; B65B 11/32; B65B 61/20; B65B 61/22; B65B 3/025; B65B 43/50; B65B 43/10; B65B 49/02
USPC .................................................... 53/575–577
See application file for complete search history.

(56) References Cited

U.S. PATENT DOCUMENTS

| | | | | | |
|---|---|---|---|---|---|
| 2,412,370 | A * | 12/1946 | Tascher | B65B 5/024 | 53/542 |
| 2,606,411 | A * | 8/1952 | Hultin | B65B 43/10 | 53/449 |
| 3,014,321 | A * | 12/1961 | Lesch | B65B 5/06 | 53/157 |
| 3,866,391 | A * | 2/1975 | Puskarz | B65B 11/12 | 53/497 |
| 3,875,724 | A * | 4/1975 | Langen | B65B 11/004 | 53/462 |
| 3,999,683 | A * | 12/1976 | Langen | B65H 3/08 | 414/796.6 |
| 4,221,107 | A | 9/1980 | Langen | | |
| 4,308,020 | A * | 12/1981 | Langen | B65B 35/205 | 53/566 |
| 4,334,942 | A * | 6/1982 | Thompson | B29C 67/0048 | 264/296 |
| 5,120,292 | A * | 6/1992 | Ueda | B31B 50/322 | 493/134 |
| 2010/0263333 | A1* | 10/2010 | Langen | B65D 5/02 | 53/563 |
| 2010/0330237 | A1* | 12/2010 | Deering | B65B 1/22 | 426/106 |

* cited by examiner

METHOD FOR PACKAGING ARTICLES IN BOXES AND PACKAGING DEVICE OPERATING ACCORDING TO SUCH A METHOD

CROSS REFERENCE TO RELATED APPLICATIONS

The present application is the U.S. National Stage of International Application No. PCT/IB2022/061234 filed on Nov. 21, 2022, which, in turn, claims priority to Italian Patent Application No. 10202100029753 filed on Nov. 24, 2021.

The present invention relates to a method and device for packaging articles in boxes, that are particularly suitable for packaging articles according to a process, known in the field as "wrap-around" process, wherein the box is formed around the article to be packaged.

The content of the following Patent Applications, filed on the same date by the same Applicant, is considered as herein fully incorporated:

- Italian Patent Application No. 102021000029750 titled "Metodo di confezionamento di articoli in scatole e dispositivo di confezionamento operante secondo tale metodo";
- Italian Patent Application No. 102021000029753 titled "Metodo di confezionamento di articoli in scatole e dispositivo di confezionamento operante secondo tale metodo";
- Italian Patent Application No. 102021000029756 titled "Apparato e processo per la formazione in avvolgimento di una scatola";
- Italian Patent Application No. 102021000029759 titled "Processo e apparato per la formazione in avvolgimento di una scatola";
- Italian Patent Application No. 102021000029762 titled "Dispositivo e metodo per il confezionamento di articoli in scatole"; and
- Italian Patent Application No. 102021000029765 titled "Metodo per operare su prodotti".

The present invention is preferably, though not exclusively, applied to the field of packaging in boxes articles with a variable geometry and relatively delicate, such as bags of cereal flakes, a field to which reference will be made later without losing in generality.

In particular, in the relevant technical field, articles are known to be packaged inside a box in two distinct ways.

A first method involves a first step of forming a box, open at least at one end thereof, then introducing the article to be packaged into the open box, and then closing the open end.

A second method involves forming the box by wrapping a blank, such as a shaped and creased cardboard, around a mandrel made of a stiff material, such as metal, containing the article to be packaged. Such method involves wrapping the blank around the mandrel so as to form a box that is laterally closed but open at one end thereof, from which the mandrel is then extracted, leaving the article inside the newly formed box. In this case also, the open end may be conveniently closed, so that the resulting package may be sent to the final steps of packing and shipping to the points of sale.

In the present description as well as in the accompanying claims, some terms and expressions are deemed to have the meaning expressed in the hereinafter definitions, unless expressly stated otherwise.

The term "article" refers to any product susceptible of being packaged in boxes.

The articles may have a predefined geometric shape or they may have a variable geometry.

Preferably, the articles are food and confectionery articles, either loose or contained within bags or other types of wrapping, such as bags of cereals or capsules of coffee or other brewing drinks, individual chocolates (wrapped or naked), candies, pouches containing solid, liquid or semi-solid food articles; also, articles from the ceramic industry, absorbent articles for hygienic use, articles from the tobacco industry, articles from the cosmetics industry, articles from the pharmaceutical industry, articles from the personal & home care industry.

"Packaging" one or more articles in a box means obtaining a box containing said one or more articles. Such packaging may be obtained by introducing one or more articles in an already formed box or, preferably, may be obtained by forming a box around the one or more articles to be contained.

"Mandrel" refers to a container capable, on the one hand, of accommodating and supporting the article to be packaged and, on the other hand, of providing an effective abutment for folding the blank when wrapped around it.

For this purpose, it must be specified that accommodating and supporting the article do not imply that the article must be fully accommodated inside the mandrel or fully supported by it, but that it is as such when the blank is wrapped around the mandrel.

Similarly, it must be specified that abutting the blank does not imply that the blank must be abutted over its entire surface area by the mandrel, but that it is abutted to the extent necessary to allow for the correct folding required to form the box.

The mandrel may be formed of a single component, or of a plurality of units. The latter may be directly connected to each other or they may be "separate units", referring, with such an expression, to separate mandrel portions (units), not directly connected to each other, and preferably movable independently of each other.

A mandrel is "composed" of the separate units when the latter are reciprocally positioned in such a way as to properly fulfil the mandrel functions outlined above, i.e. to accommodate and support the article to be packaged and to provide an effective abutment in order to fold the blank.

By contrast, a mandrel is "decomposed" into its separate units when it is no longer capable of performing properly its functions of accommodating and supporting the article and abutting the blank.

"Blank" refers to a shaped sheet of suitable material and thickness that is adapted to be wrapped by folding around a mandrel to form a box.

Preferably, the blank is made of cardboard.

Preferably, the blank has a thickness of at least 0.2 mm, more preferably less than 4 mm. Most preferably, the blank has a thickness comprised between 0.25 mm and 1.6 mm thick, more preferably between 0.3 mm and 1 mm, even more preferably between 0.4 and 0.8 mm.

A "folding line" of a blank is a predefined line around which two blank portions are expected to rotate relative to each other so as to fold the blank, preferably around the mandrel.

The folding line may be a virtual line even if it is predefined.

The folding line is preferably defined by a weakening line obtained on the blank, such as a creasing, or a score or a plurality of aligned holes.

In general terms, a first element "abuts" a second element when the first element touches the second element and is able to at least partially oppose a relative displacement of the first element against the second element.

In particular, a folding line is “abutted” by a component of the packaging device, such as a mandrel or folding element, when the component, in order to fold the blank around the folding line, abuts the blank at a distance from the folding line less than 10 times the thickness of the blank, preferably less than 5 times the thickness of the blank.

Thereby, the useful and effective distance for effectively abutting the folding line of a blank is parametrized on the thickness of the blank, which, in general, may be considered as the characteristic that mostly affects the yielding of the blank while being folded.

Considering the thickness of the blanks used in the field of packaging articles in boxes, a folding line may be considered to be “abutted” by a component of the packaging device when the component, in order to fold the blank around the folding line, abuts the blank at a distance from the folding line of less than 5 mm, preferably less than 3 mm.

Two or more components of a packaging device, such as a mandrel and a folding element, are in a “folding configuration” when, acting on the two blank portions defined on either side of a folding line in order to fold a blank, they are at a minimum distance from each other of less than 20 times the thickness of the blank, preferably less than 10 times the thickness of the blank.

Considering the thickness of the blanks used in the field of packaging articles into boxes, two or more components of a packaging device may be considered to be in a “folding configuration” when, acting on either side of a folding line to fold a blank, they are at a minimum distance from each other of less than 10 mm, preferably less than 5 mm.

“Box” refers to any container adapted to contain a plurality of articles for the purpose of packaging them, which is susceptible of being made from a blank by folding it around a mandrel and then attaching it at its edges or panels.

Preferably, the box has at least one closed-perimeter section, more preferably it is closed laterally around the mandrel while the longitudinal ends are kept open.

The Applicant preliminarily noted that the wrap-around packaging process briefly outlined above allows to obtain significant advantages in terms of production flexibility compared to the packaging process which introduces the article in the preformed box. In fact, in the wrap-around packaging process, the time to switch between formats or to bring new formats into production is significantly reduced.

The Applicant noted, however, that the wrap-around packaging process briefly outlined above is often little suitable for packaging fragile items, such as bags containing cereal flakes. The latter can easily break, forming crumbs and dust that lower the quality of the final product.

In particular, the Applicant noted that one of the critical steps in moving articles in the box packaging process, is depositing them in the mandrel around which the box is formed, during which the articles may be subject to even violent impacts.

In fact, the Applicant noted that articles are often thrown or dropped into the mandrel at high speeds, resulting from the high production capacity required.

The Applicant therefore envisaged using gentler systems for depositing articles in the mandrel, for example by using grippers that may support the articles from underneath and then lay them directly on the bottom of the mandrel.

However, the Applicant verified that the possibility of using such article depositing systems was limited by the shape itself of the mandrel, which typically consists of a parallelepiped closed at the bottom and at the sides and open only at the top for the article access from above.

In particular, the Applicant verified that such a shape would not allow the grippers to disengage from the article and escape from the mandrel without interfering with its side walls.

The Applicant therefore perceived that, in order to enable the use of these article depositing systems, the shape of the mandrel had to be changed, while still ensuring the proper fulfilment of its functions, in particular its ability to effectively abut the blank when it is wrapped around the mandrel to form a box.

For this purpose, the Applicant noted that the step of folding the blank around the mandrel is carried out by abutting the blank on opposite surfaces with an abutment surface of the mandrel and a folding element of the packaging device.

Specifically, the mandrel and the folding element abut the blank at a folding line thereof (formed by a creasing, for example), by means of their respective parallel edges facing each other, which in their relative movement are very close to the folding line, so as to ensure that the blank is folded around the folding line in a precise way.

However, the Applicant realised that it was possible to optimally fold the blank at the folding line even in case the folding line was not abutted by the mandrel to its full extent.

On the basis of this insight, the Applicant finally found that a method and device for packaging articles in a box that involves folding the blank around the mandrel along a folding line wherein the folding line is abutted with a mandrel edge only for a part thereof, while the remaining part of the folding line is not abutted by the mandrel, surprisingly allows to fold the blank in an excellent way and to define, at the same time, new ways to access the mandrel.

Therefore, the present invention, in a first aspect thereof, relates to a method for packaging articles in boxes.

Preferably, such a method comprises the step of depositing at least one of said articles into a mandrel.

Preferably, such a method comprises the step of wrapping a blank around said mandrel so as to form an at least partially closed box around said article deposited in said mandrel.

Preferably, such a method comprises the step of folding a blank around said mandrel in correspondence with at least one folding line of said blank.

Preferably, said folding step aims at forming a box containing said at least one of said articles.

Preferably, said blank is folded along said folding line by abutting said folding line with an edge of said mandrel only for a first part of said folding line.

Preferably, a second part of said folding line, different from said first part, remains not abutted by said mandrel.

It will be noted that since the folding line is either abutted or not abutted, the sum of the first part of the folding line and the second part of the folding line results in the entire folding line. In other words, the second part of the folding line is complementary to the first part.

It will also be noted that neither the first part nor the second part are necessarily formed by a single tract of a folding line, but, on the contrary, they may be formed by separate and distinct folding line tracts.

The present invention, in a second aspect thereof, relates a device for packaging articles in boxes.

Preferably, said device comprises a mandrel configured to accommodate therein one of said articles and to abut a blank when wrapped at least partially outside said mandrel in order to form one of said boxes.

Preferably, said device comprises a folding element on which an abutment region is defined which is intended to abut said blank and configured to cooperate with said mandrel to fold said blank around said mandrel when said blank is positioned between said mandrel and said folding element and when said mandrel and said folding element are positioned together in a folding configuration.

Preferably, said device comprises a movement member configured to displace said mandrel with respect to said folding element towards said folding configuration.

Preferably, in said folding configuration, at least a first zone is defined on said abutment region of said folding element which is spaced from an edge of said mandrel facing said abutment region by a first distance dimensioned to be greater than the thickness of said blank.

Preferably, in said folding configuration, at least a second zone is defined on said abutment region of said folding element, which is spaced from any edge of said mandrel facing said abutment region by a second distance greater than said first distance.

Preferably, said at least a second zone is adjacent to said first zone.

Thanks to these characteristics, the method and the packaging device according to the present solution allow to create access openings inside the mandrel even in proximity of a folding line of the blank, while maintaining excellent precision in folding the blank, without therefore affecting the quality of the box formed around the mandrel.

The movement member may be any mechanism capable of displacing the packaging device along a predefined path and is represented by a conveyor driven by electric or mechanical or pneumatic or hydraulic motors or other similar known systems capable of displacing the packaging device along any trajectory, e.g. straight, curved, closed in a loop, circular.

Examples of movement devices are conveyor belts, robotic arms and carousels.

The present solution, in at least one of the above-mentioned aspects, may have at least one of the following additional preferred characteristics.

In some embodiments, said first part of said folding line has a length of least 20% the length of said folding line, preferably comprised between 40% and 90% of the length of said folding line, more preferably comprised between 50% and 80% of the length of said folding line.

Optimal conditions are thereby defined to allow an adequate access to the mandrel and adequate accuracy in folding the blank.

In some embodiments, said second part of the folding line not abutted by said edge of said mandrel comprises an end region of said folding line.

It is thereby possible to have an access opening to the mandrel at one of its end regions, or it is possible to fold a blank that is longer than the mandrel. The latter case may be useful when a box is to be created that is longer than necessary to hold the article, so as to leave some free space to accommodate any additional objects, e.g. gadgets, which may be introduced into the box at a later stage.

It will be noted that in this case, the larger box could be formed by keeping the same mandrel used to form the smaller box normally used to package the article without gadgets.

In some embodiments, said second part of the folding line not abutted by said edge of said mandrel comprises a median region of said folding line.

An access to the mandrel is thereby obtained in a median region thereof, which is particularly advantageous to allow the passage of a gripping member from outside to inside the mandrel and vice versa, in order to gently deposit the article on the bottom of the mandrel.

Furthermore, the Applicant has verified that if the folding line is abutted by the mandrel at both end regions, the quality of the resulting fold is ensured even when the median part of the folding line not abutted by the mandrel is particularly large.

In some embodiments, said blank is folded around said mandrel at said folding line while the mandrel is moving.

In some embodiments, said blank is folded along said folding line abutting with said mandrel edge a panel of said blank placed on one side of said folding line and with a folding element, spaced from said mandrel edge, another panel of said blank placed on the opposite side of said folding line.

The blank is thereby folded around the folding line by acting on portions of the blank that are divided by the folding line (and thus placed on opposite sides of the folding line), making the mandrel and a suitably shaped folding element cooperate with each other.

The folding element may be made as a fixed or movable plate suitably positioned to pass close to the mandrel and suitably configured to abut a panel of the blank not abutted by the mandrel and fold it against the mandrel.

In some embodiments, said blank is folded along said folding line by abutting opposite surfaces of said blank with said edge of said mandrel and with said folding element respectively.

The blank is thereby folded around the folding line by pressing on the opposite surfaces of the blank on either side of the folding line.

Preferably, said folding line is abutted entirely by said folding element.

It is thereby ensured that, at least on one side of the blank, the folding line is abutted to its full extent, leaving the mandrel free to have "missing" zones, such as recesses or openings, which make it possible to define further ways of access within the mandrel.

In some embodiments, said folding line is formed by a creasing or by a scoring line or by a line of holes obtained on said blank.

Folding the blank around the desired folding line is thereby made easier. In addition, the folding line is made immediately identifiable.

In an alternative embodiment, the folding line is a virtual line along which the blank has no different material characteristics.

In some embodiments, said first distance is less than 10 times the thickness of the blank, preferably less than 5 times the thickness of the blank.

The blank is thereby provided with the necessary space to be folded between the mandrel and the folding element.

Preferably, said first distance is less than 10 mm, more preferably less than 5 mm, even more preferably less than 3 mm and most preferably about 1 mm.

In some embodiments, said second distance is greater than 10 times the thickness of the blank, preferably greater than 20 times the thickness of the blank.

In some embodiments, said mandrel comprises a side wall configured to abut said blank in said folding configuration.

Preferably, said side wall comprises said edge which, in said folding configuration, faces said first zone of said abutment region of the folding element.

The blank is thereby folded between the edge of one side wall of the mandrel and the abutment region of the folding element.

In some embodiments, in said folding configuration, said abutment region faces said edge at said first zone and said second zone is defined by a zone of said abutment region protruding longitudinally from said mandrel.

It is thereby possible to fold a blank around its folding line even when the latter is longer than the mandrel.

In some embodiments, in said folding configuration, said abutment region faces said edge at said first zone and said second zone is defined by a zone of said abutment region facing said edge at a recess obtained on said side wall.

An access to the mandrel is thereby formed at a median region of its side wall, at the recess obtained thereon.

In some embodiments, said edge, in said folding configuration, faces said second zone of said abutment region at a distance greater than 20 mm, preferably greater than 30 mm, more preferably greater than 50 mm.

Thus, the recess obtained in the side wall is deep enough to allow an adequate access to the mandrel.

In some embodiments, in said folding configuration, said abutment region faces said edge at said first zone and said second zone is defined by a zone of said abutment region facing an opening interrupting said side wall.

Thus, the side wall is divided into two distinct and separate portions, further enlarging the access to the mandrel.

In particular, it will be noted that both edges of the side wall are thereby interrupted and have respective zones where they do not abut the folding line of the blank.

In some embodiments, said mandrel is formed by a single element.

In some embodiments, said mandrel formed by several separate units.

In some embodiments, said opening extends along the entire perimeter of a cross-section of said mandrel.

In other words, the opening cuts the mandrel crosswise into two separate units.

In some embodiments, said separate units are brought closer to each other to compose said mandrel.

In one embodiment, said mandrel is formed by bringing these units closer to each other until they come into direct contact with each other.

In an alternative embodiment, the mandrel is composed by bringing the separate units closer to each other without direct contact.

Preferably, said mandrel is composed by bringing said plurality of units closer to each other to a distance of less than 200 mm, more preferably to a distance comprised between 60 mm and 170 mm.

In some embodiments, said packaging device comprises an article feeder provided with a member for gripping said article. Preferably, said gripping member is configured to deposit said article in said mandrel by passing through said recess or opening.

The article feeder may be any device capable of introducing an article into a mandrel, as provided by the prior art.

The article feeder may comprise a gripping member and a gripping member movement system.

Examples of article feeders are represented by grippers, clamps, pushers or suction cups (representing the gripping members) mounted on the arms of a carousel or on robotic arms or linear actuators.

In some embodiments, said packaging device comprises a blank feeder arranged to position a blank between said mandrel and said folding element at a defined folding line on said blank.

The blank feeder may be any device capable of holding a blank, displacing the blank to a predefined position and releasing the blank.

Examples of blank feeders are represented by grippers, clamps or suction cups mounted on the arms of a carousel or on robotic arms or linear actuators.

In some embodiments, said movement member comprises a carousel arranged to displace said mandrel along a predefined path, preferably circular.

In some embodiments, said folding element comprises a pair of plates, between which said mandrel is led.

Preferably, said blank is interposed between said folding element and said mandrel at the entrance of said pair of plates.

In some embodiments, said folding element comprises a movable strip along a direction perpendicular to the mandrel movement direction.

In a further embodiment of the present solution, a method of forming a box with articles is described, comprising:

depositing at least one of said articles in a mandrel, and folding a blank around said mandrel at least at one folding line of said blank in order to form a box containing said at least one of said articles, wherein said folding line comprises a first part of said folding line and a second part of said folding line, and wherein said folding comprises abutting said first part with an edge of said mandrel and not abutting said second part with said mandrel.

It is specified that some steps of the methods described above may be independent of the order of execution reported. In addition, some steps may be optional. Furthermore, some steps of the methods may be performed repetitively, or they may be performed in series or in parallel with other steps of the method.

The characteristics and advantages of the present invention will become clearer from the detailed description of a preferred embodiment thereof, shown, by way of non-limiting example, with reference to the accompanying drawings wherein.

Figure 1:
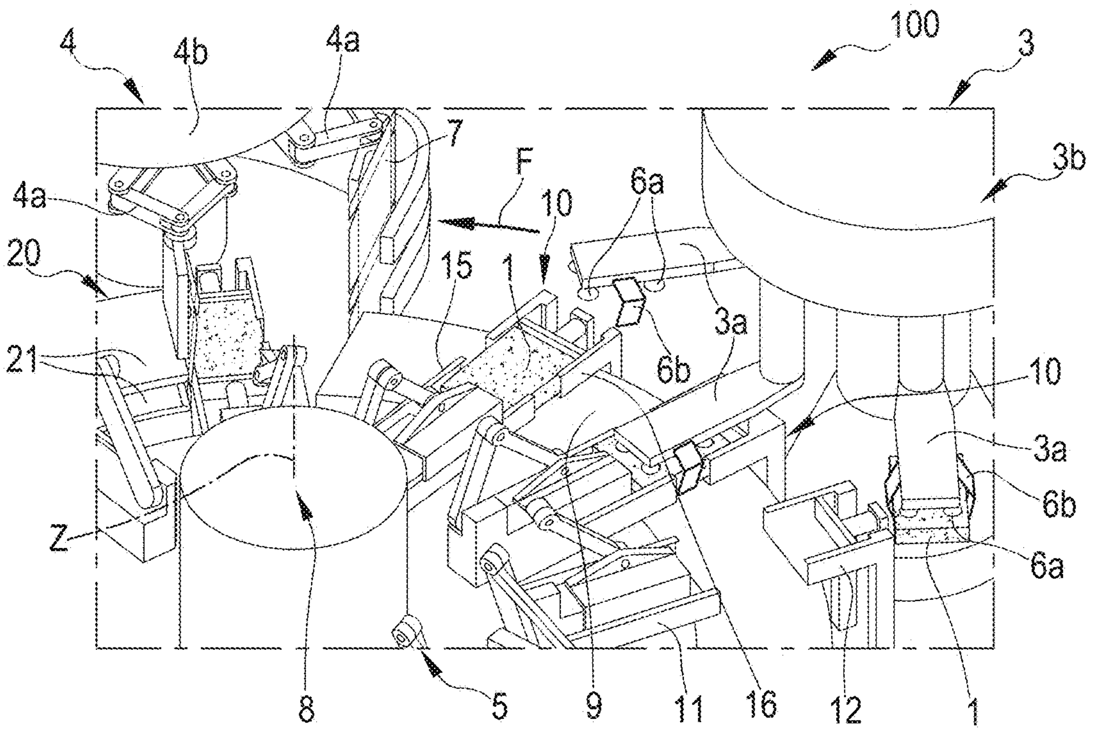
FIG. 1 is a partial schematic and perspective view from above of a first example of a device for packaging articles in boxes made in accordance with the present solution.

Referring initially to FIGS. 1 to 4, number 100 globally denotes a packaging device made in accordance with the present solution.

The packaging device 100 is arranged to package one or more articles 1 in boxes 2.

The articles 1 are, in this preferred embodiment, bags of granular, loose food products, e.g. cereal flakes, in particular bags with a longitudinal dimension of about 300 mm (exemplary value).

The packaging device 100 comprises, in its most general units, an article feeder 3, a blank feeder 4 and a packaging unit 5.

The article feeder 3 may be made in any form that is suitable to take an article 1 from an upstream work station (or a warehouse) and deliver it to the packaging unit 5. For example, the article feeder 3 may comprise a plurality of gripping members 3*a*, mounted on a vertical axis carousel 3*b*. The gripping members 3*a* may comprise fixed suction cups 6*a* and a gripper provided with a pair of movable prongs 6*b*, extended towards each other to hold and support the article 1 laterally and from below.

The blank feeder 4, is in turn configured to take a single blank 7 from a set of blanks stacked in a hopper and bring it to the packaging unit 5. For example, the blank feeder 4 may comprise a plurality of gripping members 4*a* mounted on a carousel 4*b* rotatable around an axis substantially parallel to a vertical direction, generically indicated in the Figures by Z.

The packaging unit 5 is arranged to receive articles 1 from the article feeder 3 and form a box 2 around them from a blank 7 supplied by the blank feeder 4.

For this purpose, the packaging unit 5 comprises a plurality of mandrels 10 all mounted on a carousel 8, rotatable around a vertical axis, so as to be moved along a displacement direction F defining a substantially circular path.

Thus, each mandrel 10 is led along the circular path between a receiving zone, in which the mandrel 10 receives an article 1 from the article feeder 3, an abutment zone, in which the mandrel 10 abuts a blank 7 supplied by the blank feeder 4, a forming zone, in which the blank 7 is folded to form a box 2 containing the article 1, an unloading zone, in which the box 2 containing the article 1 is delivered to the next processing stations and, finally, a return zone in which the mandrel 10 is returned to the receiving zone.

In the first embodiment described herein, shown in FIGS. 1 to 4, each mandrel 10 comprises a first unit 11 and a second unit 12, distinct and separate from each other, both mounted on an arm 14 radially extended from the carousel 8 and passing below a fixed working surface 9 of the packaging unit 5.

Specifically, the first unit 11 and the second unit 12 are mounted on the arm 14 by means of a respective upright 11*a*, 11*b* erected by the arm 14 so as to support the units 11 and 12 on opposite sides of the working surface 9 and above the level defined by it.

Referring to the vertical axis around which the carousel 8 rotates, the first unit 11 is in a radially inward position relative to working surface 9, while the second unit 12 is in a radially outward position relative to working surface 9.

The first unit 11 and the second unit 12 are substantially identical to each other and are arranged facing each other symmetrically in relation to the working surface 9.

The first unit 11 and the second unit 12 may be displaced with respect to each other between an operating position, wherein the two units 11, 12 are brought closer to each other, and a non-operating position wherein they are moved away from each other, so as to decompose the mandrel 10.

In particular, the first unit 11 and the second unit 12 may be displaced along a radial direction of the carousel 8, which, in this case, also corresponds to a longitudinal direction defined on the mandrel 10.

In the embodiment herein described and shown, the two units 11 and 12 are brought closer to each other to a distance of about 100-120 mm, thus defining an opening 17 extending along the entire perimeter of the mandrel 10.

On the mandrel 10, composed of the two units 11 and 12 brought closer to each other, a bottom 13 is identified, defining a support surface on which the article 1 is deposited, as well as a pair of side walls 15 and 16, which delimit the bottom 13 at the opposite longitudinal sides.

Both the bottom 13 and the side walls 15, 16 are therefore formed by respective portions provided in the first unit 11 and second unit 12. In particular, the side walls 15 and 16 comprise respective pairs of portions 15*a*, 15*b* and 16*a*, 16*b*, wherein the portions of each pair are separated from each other by the opening 17.

On each side wall 15, 16 a lower edge 18*a* is also identified that is substantially coplanar with the bottom 13 and an upper edge 18*b*, spaced from and substantially parallel to the bottom 13.

In each of the first unit 11 and second unit 12, there is also provided a positioning element 19, of the piston type, which longitudinally delimits the bottom 13 of the mandrel, so as to define in the mandrel 10 a chamber for accommodating the article 1 delimited by the bottom 13, the side walls 15 and 16 and the positioning elements 19.

The blank 7 is made of cardboard with a thickness of between 0.4 and 0.8 mm, in this case about 0.5 mm, and is suitably shaped to form a box 2 when folded around the mandrel 10.

For this purpose, folding lines 7*a* are cut on the blank 7 which divide the blank 7 into a plurality of panels 7*b*, 7*c* intended to form, alone or in combination, the different faces of the box 2.

The folding lines 7*a* are preferably creases and each pair of adjacent panels 7*b*, 7*c* may be swung around a respective folding line 7*a* separating them.

In particular, a central panel 7*b*, intended to be first abutted by the mandrel 10, as well as two panels 7*c*, extending from the upper and lower sides of the central panel 7*b* respectively, and separated from it by respective folding lines 7*a* are identified in the blank 7.

The packaging unit 5 further comprises at least one folding element 20 configured to cooperate with the mandrel 10 to fold the blank 7 around the mandrel.

In particular, the packaging device 100 may comprise several folding elements 20, each one intended to fold one or more panels 7*b* of the blank.

A first example of a folding element 20 is represented by a pair of plates 21 positioned on the circular path of the mandrels 10 immediately downstream of the point where the blank 7 is delivered to the packaging unit 5 by the blank feeder 4.

The plates 21 are parallel to and spaced from each other so that the mandrel 10 can pass between them at a close distance H, of about 1 mm between the two plates 21 and the lower and upper edges 18*a*, 18*b* of the side walls 15, 16 of the mandrel 10.

On each plate 21 an abutment region 22 is defined which is intended to abut the blank 7 when it is displaced by the mandrel 10 against the plates 21.

The abutment region 22 extends parallel to the upper and lower edges 18*a*, 18*b* of the side walls 15, 16 of the mandrel 10, in other words parallel to the longitudinal direction of the mandrel 10.

In particular, in the abutment region 22 of each plate 21, two first zones 23 are defined which are spaced from a respective lower or upper edge 18*a*, 18*b* of the mandrel 10 by a first distance H, equal to about 1 mm, and a second zone 24, interposed between the two first zones 23, which faces the opening 17 obtained in the mandrel 10.

It will be noted that the second zone 24, since it does not face any edge of the mandrel 10, may be considered to be placed at an infinite distance from any edge of the mandrel facing it.

The packaging device 100 operates as described hereinafter.

The carousel 8 rotates around its vertical rotation axis Z in a continuous motion, leading the mandrels 10 along a circular path with the first and second units 11 and 12 on radially opposite sides of the support plane 9.

Before the receiving zone, the first and second units 11, 12 are brought closer to each other to the distance indicated above so as to form a suitable seat to accommodate an article 1 deposited on the bottom 13 by means of a gripping member 3*a*.

It will be noted that, thanks to the opening 17, the prongs 6*b* of the gripper can access the inside of the mandrel 10 to gently lay the article 1 on the bottom 13 without having to drop it from above.

In the example herein described, only one article 1 is intended to be contained in the box 2, however, it is also possible to introduce in the box 2 a plurality of articles 1, all of which, in this case, would be deposited inside the mandrel 10 before being wrapped in the blank 7.

Once the item 1 has been deposited, the mandrel 10 is led towards the abutment zone with a blank 7, which is brought by the blank feeder 4 into the path of the mandrel 10, at an interruption point of the working surface 9, right at the entrance of the plates 21.

Figure 2:
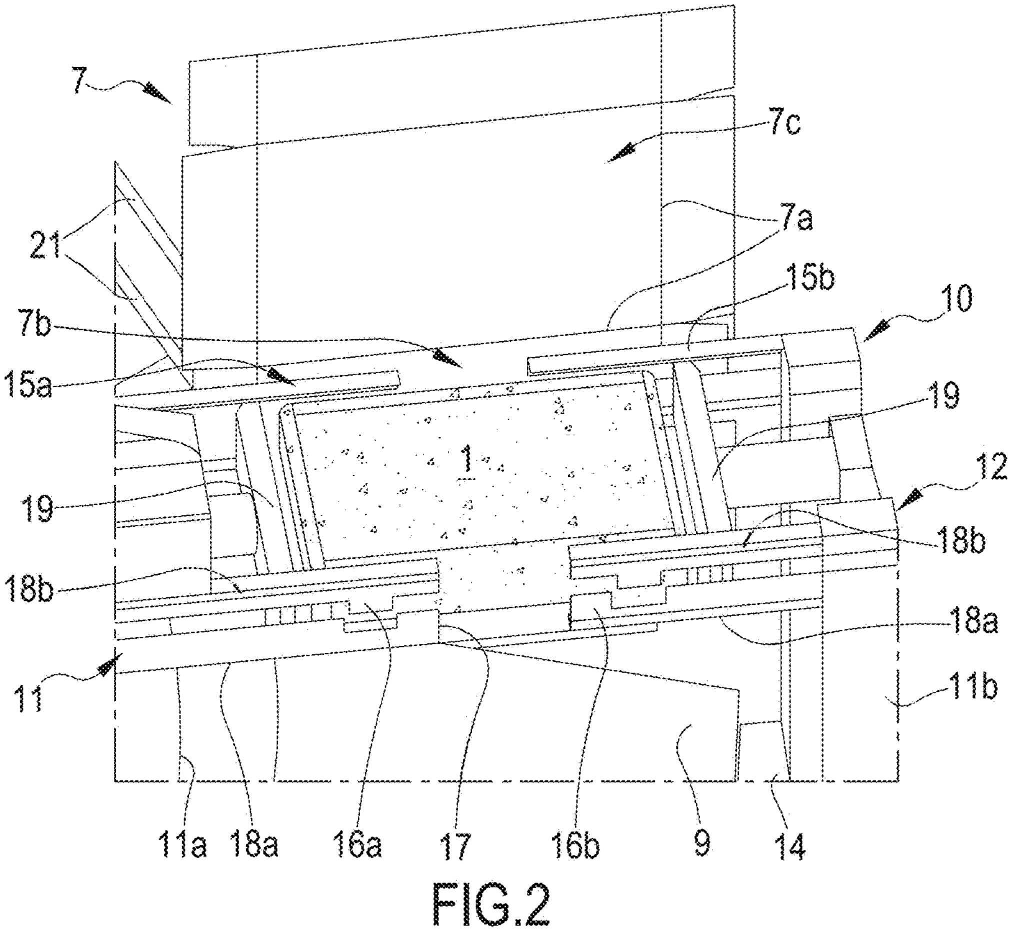
FIG. 2 is a partial schematic view from above and from the front of the packaging device of FIG. 1.

The blank 7 is positioned on a vertical plane substantially perpendicular to the displacement direction F, such that the central panel 7*b* is abutted by the side wall 15 of the mandrel 10 (FIG. 2).

In particular, the central panel 7*b* is abutted from the side wall 15 so that the lower and upper edges 18*a*, 18*b* are at a respective folding line 7*a* (spaced at most a few tenths of a millimetre apart) separating the central panel 7*b* from the lower and upper panels 7*c*.

Figure 3:
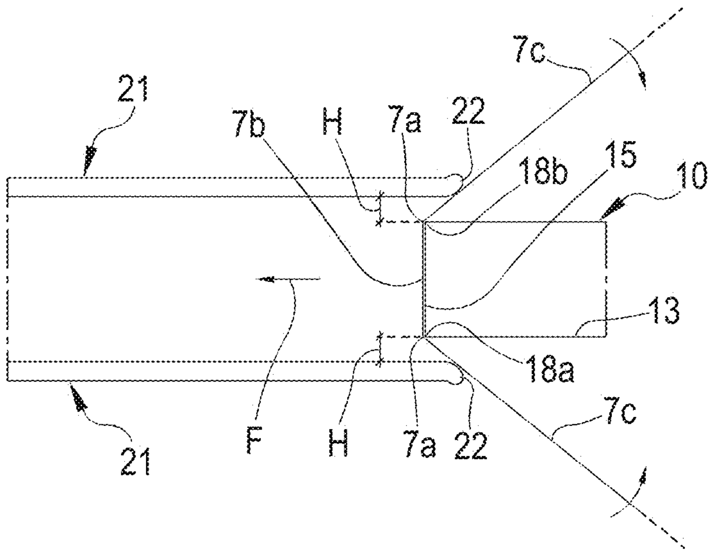
FIG. 3 is a schematic side view of a detail of the packaging device of FIG. 1 in a folding configuration.
Figure 4:
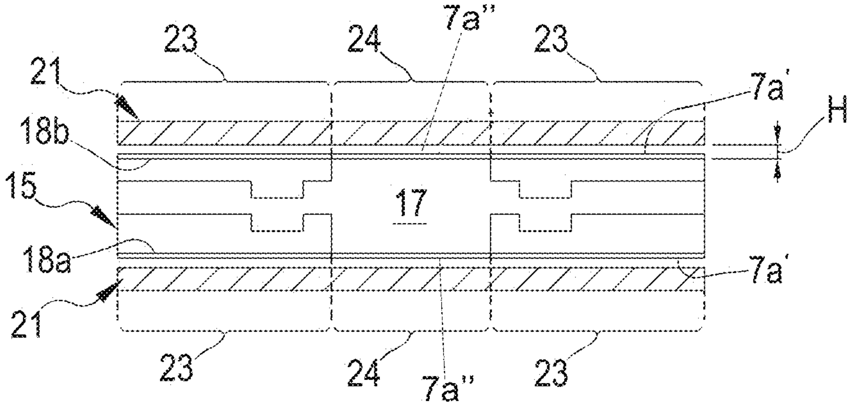
FIG. 4 is a front view of a side wall of the mandrel of the packaging device of FIG. 1.

The mandrel 10 then pushes the central panel 7*b* of the blank 7 against the abutment region 22 of the plates 21, and then enters the space between the two plates, dragging the central panel 7*b* with it, causing the panels 7*c* to fold towards the mandrel 10 (FIG. 3).

It follows that, when the mandrel 10 is between the entrance of the plates 21 and then within the space defined between the plates 21, the mandrel 10 and the plates 21 may be defined in the folding configuration of the blank 7.

As visible in the accompanying Figures, each folding line 7*a* is entirely abutted by the abutment region 22 of the plates 21, while, on the mandrel side 10, it is only abutted at the lower and upper edges 18*a* and 18*b*, while it is not abutted at the opening 17.

In particular, each folding line 7*a* is abutted by the mandrel 10 in its opposite end regions 7*a*', corresponding to about 70% of the total extension of the folding line, while it remains not abutted in a median region 7*a*" thereof, corresponding to about 30% of the total extension of the folding line.

When exiting from the pair of plates 27, respective closing members, mounted on the mandrel 10 or on the working surface 9, fold the lower flap 7*d* and the upper flap 7*e* protruding respectively from the lower and upper panels 7*c* of the blank 7 against the side wall 16 of the mandrel 10 so as to laterally close the box 2, thanks to glue dots being provided on one of the two flaps.

Such closing members may be configured in the form of bars (strips) that go vertically up and down with respect to the mandrel.

It will be noted that such closing members constitute additional folding elements 20 of the packaging device 100 on which respective abutment regions may be identified, that are configured to abut a respective folding line throughout its inner extension, similarly to the abutment regions 22 of the plates 21.

Still similarly to the plates 21, in this case also in each of the abutment regions of the closing members, two first zones are defined that face a lower or upper edge of the side wall 16 and a second zone that faces the opening 17.

In particular, the first two zones are, in the folding configuration, at a distance less than 10 mm, more preferably less than 5 mm, even more preferably less than 3 mm, and most preferably about 1 mm.

Having completed the lateral closure of the box 2, the first and second units 11 and 12 are then extracted longitudinally from the box 2, and this is delivered to the next work stations, while the mandrel 10 is returned to the receiving zone.

Figure 5:
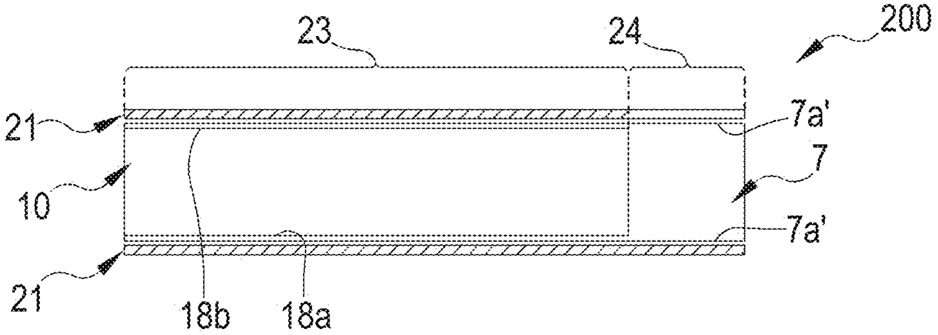
FIG. 5 is a front view of a first embodiment variant of the packaging device of FIG. 1.

FIG. 5 shows a first embodiment variant of the packaging device described above, globally indicated by 200.

Compared to the packaging device 100 described in the previous example, the mandrel 10 has differently-shaped side walls 15 and 16, which are continuous and rectangular in shape, and both the blank 7 and the plates 21 extend longitudinally more than the side walls of the mandrel, so that they protrude longitudinally from one end of the mandrel 10.

In this case, the first zone 23 of the abutment region 22 corresponds to the lower or upper edge 18*a*, 18*b* of the side wall 15, while the second zone 24 is defined by the portion of abutment region 22 protruding longitudinally from the side wall 15.

Each folding line 7*a* is thus entirely abutted by the abutment region 22 of the plates 21, while, on the mandrel side 10, it is only abutted at the lower and upper edges 18*a* and 18*b*, but remains not abutted at its end region 7*a*' which is only abutted by the second zone 24 of the abutment region 22.

Figure 6:
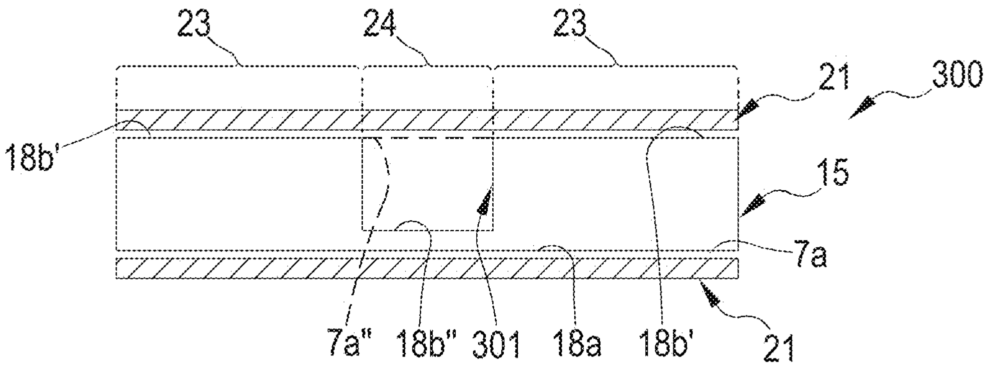
FIG. 6 is a front view of a second embodiment variant of the packaging device of FIG. 1.

FIG. 6 shows a second embodiment variant of the packaging device described above, globally indicated by 300.

Compared to the packaging device 100 described in the previous example, the mandrel 10 has differently-shaped side walls 15 and 16, which have a recess 301 at one of its longitudinal sides, in this case the upper side.

It follows that the lower edge 18*a* is continuous and straight, while the upper edge 18*b* comprises a first portion 18*b*' close to the abutment region 22 and a second portion 18*b*", at the recess 301, where the abutment region 22 is spaced apart.

For example, the first portion 18*b*' is at a distance from the abutment region 22 of about 1 mm, while the second portion 18*b*" is at a distance from the abutment region 22 of about 40 mm.

In this case, the first zone 23 of the abutment region 22 of the upper plate 21 is defined by the portion of abutment region 22 facing the first portion of the upper edge 18*b*', while the second zone 24 is defined by the portion of abutment region 22 facing the second portion 18*b*".

Each folding lines 7*a* is thus entirely abutted by the abutment region 22 of the plates 21, while, on the mandrel 10 side, it is only abutted at the lower edge 18*a* and the first portion 18*b*' of the upper edge 18*b*, while it remains not abutted in a median region 7*a*" thereof, corresponding to the second portion 18*b*" of the upper edge 18*b*.

Obviously, one skilled in the art may, in order to meet specific and contingent application requirements, make further modifications and variants to the solution described above that nevertheless fall within the scope of protection as defined by the following claims.

The invention claimed is:

1. A method for packaging articles in a box comprising:

(a) depositing at least one of said articles in a mandrel, and (b) folding a blank around said mandrel in correspondence with a folding line of said blank to form at least part of the box, a first part of said folding line abutting an edge of said mandrel and a second part of said folding line not abutting said mandrel, said at least partially formed box containing said at least one of said articles, wherein said second part of said folding line not abutting said mandrel comprises a median region of said folding line, wherein said edge of said mandrel is a longitudinal edge of said mandrel and said folding line of said blank is substantially parallel to said longitudinal edge.

2. The method according to claim 1, wherein said first part of said folding line has a length equal to at least 20% of a length of said folding line.

3. The method according to claim 1, wherein said first part of said folding line has a length between 50% and 80% of a length of said folding line.

4. The method according to claim 1, the folding further comprising:

abutting said edge of said mandrel and a first panel of said blank, and abutting a folding element, spaced from said edge of said mandrel, and a second panel of said blank, wherein the first panel of said blank and the second panel of said blank are divided by the folding line.

5. The method according to claim 4, wherein said folding line is entirely abutting said folding element.

6. The method according to claim 1, wherein said folding line is formed on said blank by at least one of:

a creasing, a scoring line, and a line of holes.

7. A packaging device for packaging articles in boxes, comprising:

a mandrel configured to accommodate one of said articles inside the mandrel and to abut a blank when said blank is wrapped at least partially outside said mandrel to form one of said boxes, a folding element comprising an abutment region, the abutment region configured to abut said blank and to fold said blank around said mandrel when:

(i) said blank is positioned between said mandrel and said folding element and (ii) said mandrel and said folding element are positioned relative to each other in a folding configuration, and a movement member configured to move said mandrel with respect to said folding element towards said folding configuration, wherein, in said folding configuration, said abutment region of said folding element comprises:

a first zone spaced from a first edge of said mandrel facing said abutment region by a first distance, and a second zone, adjacent to said first zone, spaced from any edge of said mandrel facing said abutment region by at least a second distance, the second distance being greater than said first distance, wherein, in said folding configuration, said abutment region faces said first edge at said first zone and said second zone is defined by a zone of said abutment region facing a recess edge at a recess on a side wall of the mandrel.

8. The packaging device according to claim 7, wherein said mandrel comprises a side wall configured to abut said blank in said folding configuration and said side wall comprises said first edge which, in said folding configuration, faces said first zone of said abutment region of the folding element.

9. The packaging device according to claim 7, wherein said recess edge, in said folding configuration, faces said second zone of said abutment region at a distance greater than 20 mm.

10. The packaging device according to claim 7, comprising an article feeder provided with a gripping member of said one of said articles, said gripping member being configured to deposit said one of said articles in said mandrel by passing through said recess.

11. The packaging device according to claim 7, further comprising a blank feeder arranged to position the blank between said mandrel and said folding element at a folding line on said blank.

12. The packaging device according to claim 7, further comprising said blank, wherein the first distance is greater than a thickness of said blank.

13. The packaging device according to claim 12, wherein said first distance is less than 10 times the thickness of the blank and said second distance is greater than 10 times the thickness of the blank.

14. A packaging device for packaging articles in boxes, comprising:

a mandrel configured to accommodate one of said articles inside the mandrel and to abut a blank when said blank is wrapped at least partially outside said mandrel to form one of said boxes, a folding element comprising an abutment region, the abutment region configured to abut said blank and to fold said blank around said mandrel when:

(i) said blank is positioned between said mandrel and said folding element and (ii) said mandrel and said folding element are positioned relative to each other in a folding configuration, and a movement member configured to move said mandrel with respect to said folding element towards said folding configuration, wherein, in said folding configuration, said abutment region of said folding element comprises:

a first zone spaced from a first edge of said mandrel facing said abutment region by a first distance, and a second zone, adjacent to said first zone, spaced from any edge of said mandrel facing said abutment region by at least a second distance, the second distance being greater than said first distance, wherein, in said folding configuration, said abutment region faces said first edge at said first zone and said second zone is defined by a zone of said abutment region facing an opening interrupting a side wall of the mandrel, and wherein said mandrel is formed by several separate units.

15. The packaging device according to claim 14, wherein said opening interrupting said side wall extends along an entire perimeter of a cross-section of said mandrel.

16. The packaging device according to claim 14, comprising an article feeder provided with a gripping member of said one of said articles, said gripping member being configured to deposit said one of said articles in said mandrel by passing through said opening interrupting said side wall.

* * * * *